US008915237B2

(12) United States Patent
Copley et al.

(10) Patent No.: US 8,915,237 B2
(45) Date of Patent: Dec. 23, 2014

(54) SEPARATOR (75) Inventors: Daniel J. Copley, Oxford, MS (US); Adrian R. Mincher, Leeds (GB)

(73) Assignee: Parker Hannifin Manufacturing (UK) Ltd., Hemel Hempstead, Hertfordshire (GB)

( * ) Notice: Subject to any disclaimer, the term of this patent is extended or adjusted under 35 U.S.C. 154(b) by 0 days.

(21) Appl. No.: 13/557,293

(22) Filed: Jul. 25, 2012

(65) Prior Publication Data

US 2012/0318215 A1    Dec. 20, 2012

(30) Foreign Application Priority Data

Feb. 5, 2010  (GB) .................................. 1001876.0
Jan. 13, 2011  (WO) ................. PCT/GB2011/050043

(51) Int. Cl.
| | |
|---|---|
| *F02B 25/06* | (2006.01) |
| *B01D 45/08* | (2006.01) |
| *F01M 13/02* | (2006.01) |
| *F01M 13/04* | (2006.01) |

(52) U.S. Cl.
CPC ............. *B01D 45/08* (2013.01); *F01M 13/021* (2013.01); *F01M 13/023* (2013.01); *F01M 13/04* (2013.01); *F01M 2013/0433* (2013.01)
USPC .......... 123/572; 123/573; 123/41.86; 55/337; 55/423

(58) Field of Classification Search
CPC .......... F01M 13/04; F01M 2013/0433; F01M 13/0405; B01D 50/002
USPC ......... 123/41.86, 572–575; 55/383, 482, 437, 55/467, 323, 356, 337, 336; 96/400; 95/273, 284
See application file for complete search history.

(56) References Cited

U.S. PATENT DOCUMENTS 5,499,616 A * 3/1996 Enright .......................... 123/572
5,803,025 A * 9/1998 Feucht ......................... 123/41.86

(Continued)

FOREIGN PATENT DOCUMENTS

DE        102 41 302 A1   3/2004
DE   102006 024 816 A1  12/2007

(Continued)

OTHER PUBLICATIONS

Search Report under Section 17(5) dated May 4, 2010 of the Intellectual Property Office in corresponding Great Britain Application No. GB 1001876.0.
International Search Report dated Jul. 8, 2011 in corresponding International Application No. PCT/GB2011/050043.

(Continued)

*Primary Examiner* — Noah Kamen
*Assistant Examiner* — Long T Tran
(74) *Attorney, Agent, or Firm* — Christopher Hunter (57) ABSTRACT

A separator for separating contaminants from a fluid stream has first and second chambers coupled by an aperture through which fluid can pass. An actuator can adjust the crossectional area of the aperture according to a pressure differential between the first chamber and a pressure reference. An impaction surface can deflect the first fluid stream after it enters the second chamber such that contaminants are separated from the stream. A pump generates a pressure differential across the aperture. It includes a third chamber having a second inlet for receiving a second fluid stream into the third chamber. The second inlet includes a convergent nozzle for accelerating the second fluid stream, and a third inlet for receiving the first fluid stream downstream of the impaction surface, the third inlet being arranged relative to the second inlet such that the second fluid stream can entrain and accelerate the first fluid stream.

25 Claims, 6 Drawing Sheets

(56) References Cited

U.S. PATENT DOCUMENTS

| | | | |
|---|---|---|---|
| 6,009,846 A | | 1/2000 | Walker |
| 6,152,120 A | * | 11/2000 | Julazadeh ..................... 123/572 |
| 6,973,925 B2 | * | 12/2005 | Sauter et al. .................. 123/572 |
| 2005/0016937 A1 | * | 1/2005 | Smullin ........................ 210/800 |
| 2006/0059875 A1 | * | 3/2006 | Malgorn et al. ................ 55/468 |
| 2006/0062699 A1 | * | 3/2006 | Evenstad et al. .............. 422/110 |
| 2006/0249128 A1 | * | 11/2006 | Shieh ........................... 123/572 |
| 2007/0125695 A1 | * | 6/2007 | Pichler ......................... 210/314 |
| 2007/0251235 A1 | * | 11/2007 | Schmid et al. ............... 60/605.2 |
| 2009/0114088 A1 | | 5/2009 | Evenstad et al. |
| 2009/0120854 A1 | | 5/2009 | Parikh et al. |
| 2009/0288560 A1 | | 11/2009 | Ruppel et al. |
| 2010/0006075 A1 | | 1/2010 | Ruppel et al. |
| 2010/0101425 A1 | | 4/2010 | Herman et al. |
| 2010/0294218 A1 | * | 11/2010 | Ruppel et al. ............. 123/41.86 |

FOREIGN PATENT DOCUMENTS

| | | |
|---|---|---|
| DE | 10 2006 041 213 A1 | 3/2008 |
| DE | 10 2008 044 857 A1 | 8/2010 |
| WO | 02070871 A2 | 9/2002 |
| WO | 2009025927 A1 | 2/2009 |
| WO | 2009037496 A2 | 3/2009 |
| WO | 2011014289 A1 | 2/2011 |
| WO | 2011095790 A1 | 8/2011 |
| WO | 2013017832 A1 | 2/2013 |

OTHER PUBLICATIONS

International Search Report dated Oct. 26, 2012 in corresponding International Application No. PCT/GB2012/051729.

Notice of Transmittal of the International Preliminary Report on Patentability dated May 14, 2012 in corresponding International Application No. PCT/GB2011/050043.

* cited by examiner

SEPARATOR

CROSS REFERENCE TO RELATED APPLICATIONS

This application is a continuation of co-pending International Application No. PCT/GB2011/050043, filed Jan. 13, 2011, which designated the United States, the disclosure of which is incorporated herein by reference, and which claims priority to Great Britain Patent Application No. GB 1001876.0, filed Feb. 5, 2010.

BACKGROUND OF THE INVENTION

The present invention relates to a separator. In particular, the present invention relates to a separator for separating particulate, liquid and aerosol contaminants from a fluid stream. Certain embodiments of the present invention relate to a separator for separating particulate, liquid and aerosol contaminants from a blow-by gas stream within a reciprocating engine. Embodiments of the present invention also relate to a regulator. In particular, embodiments of the present invention relate to a regulator for regulating the pressure within a crankcase ventilation system. Embodiments of the present invention provide an integral separator and regulator suitable for use in a pump assisted crankcase ventilation system.

Blow-by gas within a reciprocating engine is generated as a by-product of the combustion process. During combustion, some of the mixture of combustion gases escape past piston rings or other seals and enter the engine crankcase outside of the pistons. The term "blow-by" refers to the fact that the gas has blown past the piston seals. The flow level of blow-by gas is dependent upon several factors, for example the engine displacement, the effectiveness of the piston cylinder seals and the power output of the engine. Blow-by gas typically has the following components: oil (as both a liquid and an aerosol, with aerosol droplets in the range 0.1 μm to 10 μm), soot particles, nitrous oxides (NOx), hydrocarbons (both gaseous hydrocarbons and gaseous aldehydes), carbon monoxide, carbon dioxide, oxygen, water and other gaseous air components.

If blow-by gas is retained within a crankcase with no outlet the pressure within the crankcase rises until the pressure is relieved by leakage of crankcase oil elsewhere within the engine, for example at the crankcase seals, dipstick seals or turbocharger seals. Such a leak may result in damage to the engine.

In order to prevent such damage, and excessive loss of oil, it is known to provide an outlet valve that allows the blow-by gas to be vented to the atmosphere. However, with increasing environmental awareness generally, and within the motor industry in particular, it is becoming unacceptable to allow blow-by gas to be vented to atmosphere due to the discharge of oil and other contaminants from within the crankcase. Furthermore, such venting increases the speed at which crankcase oil is consumed.

Consequently, it is known to filter the blow-by gas. The filtered blow-by gas may then either be vented to the atmosphere as before (in an open loop system), or it may be returned to an air inlet of the engine (in a closed loop system). The blow-by gas may pass through a filtering medium or another known form of gas contaminant separator. The conventional arrangement of an engine blow-by gas/oil separator returning cleaned gas to an engine air intake is commonly referred to as a Closed Crankcase Ventilation system (CCV). Conventional CCV systems require the use of an additional crankcase pressure regulator in order to ensure that an excessive proportion of the vacuum generated by the engine air intake is not translated via the CCV separator to the engine crankcase.

For a CCV system, filtration is required in order to remove oil, soot and other contaminants to protect engine components from fouling and any resultant reduction in performance or failure of a component.

There is an increasing demand for higher efficiency cleaning of blow-by gas in both open and closed loop systems. For instance, an overall oil separation efficiency of greater than 98% measured by mass (gravimetric) for particles collected using an absolute measurement filter is required by many engine manufacturers. In some cases an efficiency requirement is given for specific particle sizes as small as 0.2 microns, which may be as high as 85%

Separation using filter mediums is undesirable as such filters have a finite lifespan before they become clogged and must be replaced. Engine manufacturers and end users in general prefer to only use engine components that can remain in place for the life of the engine. While fit for life separators are known, typically only powered centrifugal separators and electrostatic precipitators have hitherto been able to achieve the required levels of separation efficiency. Such separators are costly to manufacture, consume electrical power, or have moving parts which may be prone to wear. Low cost, fit for life impactor separators (where separation occurs as a contaminated gas stream is incident upon an impactor plate transverse to the gas flow) are not usually able to achieve the required separation efficiency. Impactor separators are also referred to in the art as inertial gas-liquid impactor separators. It is known to use inertial gas-liquid impactor separators in closed crankcase ventilation systems. Contaminants are removed from the fluid stream by accelerating the fluid to a high velocity through a slit, nozzle or other orifice and directing the fluid stream against an impactor plate to cause a sharp directional change.

WO-2009/037496-A2 in the name Parker Hannifin (UK) Ltd discloses a separator for separating contaminants from a fluid stream. The separator comprises: a chamber, a first inlet for receiving a first fluid stream, the first inlet having a convergent nozzle for accelerating the first fluid stream and a second inlet for receiving a second fluid stream including entrained contaminants. The second inlet is arranged relative to the first inlet such that the first fluid stream can entrain and accelerate the second fluid stream forming a combined fluid stream within the chamber. A surface is coupled to the chamber and arranged such that the surface can cause a deviation in the course of the combined fluid stream incident upon it such that contaminants are separated from the combined fluid stream.

According to this known form of separator, contaminants can be removed from a fluid stream to a high level of efficiency without the need for driven or moving parts. The separator is suitable for separating contaminants from a gas stream such as a blow-by gas stream derived from an internal combustion engine. The first fluid stream may be derived from a turbo compressor or other source of compressed air within a vehicle engine and serves to draw the blow-by gas from the crankcase of an engine. The first fluid stream forms an area of reduced pressure in the chamber. Such a separator may be a fit for life separator owing to the absence of moving parts that may fail or filter mediums that would be prone to clogging and require periodic replacement.

For separators having an impaction surface arranged to cause separation by deflecting the fluid stream, the separation efficiency can be increased by providing a nozzle through which the fluid stream passes. The nozzle causes the fluid stream to be accelerated such that the fluid stream is incident upon the impaction surface at a higher velocity. It is desirable to apply a nozzle with the smallest possible cross sectional area in order to achieve the highest velocity and separation efficiencies. An undesirable consequence of this is that there is a higher pressure drop created across the separator. In order to prevent the crankcase pressure increasing to unacceptable levels, the size of the nozzle and consequently the performance of the separator must be limited. To control crankcase pressure within acceptable limits a pressure regulator must also be added either upstream or downstream of the separator.

Such inertial separators as described above, having fixed section nozzles produce an air-stream having a uniform velocity across the impactor face. Due to the difference in inertia of different sized particles a characteristic fractional separation efficiency profile results with the smallest particles having significantly lower chances of successful separation compared to larger and heavier particles.

SUMMARY OF THE INVENTION

It is an object of embodiments of the present invention to obviate or mitigate one or more of the problems associated with the prior art, whether identified herein or elsewhere. Specifically, it is an object of embodiments of the present invention to provide a high efficiency, fit for life separator for separating contaminants from a fluid stream that is not dependent upon electrical power, or complex rotating parts. It is a further object of embodiments of the present invention to provide a high efficiency separator that can prevent the fluid inlet pressure rising to unacceptable levels.

According to a first aspect of the present invention there is provided a separator for separating contaminants from a fluid stream, comprising: a first chamber having a first inlet arranged to receive a first fluid stream including entrained contaminants; a second chamber coupled to the first chamber through an aperture such that the first fluid stream can pass through the aperture into the second chamber; an actuator arranged to the adjust the cross sectional area of the aperture according to a pressure differential between fluid pressure in the first chamber and a pressure reference; an impaction surface coupled to the second chamber arranged to deflect the first fluid stream after the first fluid stream enters the second chamber such that contaminants are separated from the first fluid stream; and a pump arranged to generate a pressure differential across the aperture to draw the first fluid stream through the aperture; wherein the pump comprises a third chamber having a second inlet for receiving a second fluid stream into the third chamber, the second inlet including a convergent nozzle for accelerating the second fluid stream, and a third inlet for receiving the first fluid stream downstream of the impaction surface, the third inlet being arranged relative to the second inlet such that the second fluid stream can entrain and accelerate the first fluid stream.

An advantage of the first aspect of the present invention is that the pump generates a region of reduced pressure downstream of the impaction surface which allows for a high pressure differential to be maintained across the separator without causing the inlet pressure to rise to unacceptable levels. Furthermore, the actuator ensures that the inlet pressure is maintained at a predetermined level relative to the pressure reference.

The aperture may have a smaller cross sectional area than the first inlet and is arranged to accelerate the first fluid stream towards the impaction surface.

The rate of change of the cross sectional area of the aperture may be arranged to have a non-linear response to a change in the pressure differential.

The rate of change of cross sectional area of the aperture may also be arranged to cause a distribution in the fluid velocity across the face of the impaction surface.

The actuator may respond to increasing pressure in the first chamber by increasing the open area of the aperture.

The actuator may comprise a diaphragm separating the first and second chambers from the pressure reference, and wherein the pressure reference comprising a fourth chamber having an air inlet such that the third chamber is at atmospheric pressure.

The first chamber may be defined by an inner tube arranged to receive the first fluid stream at a first end of the inner tube and the second chamber is defined by an outer tube surrounding the first chamber, the second end of the outer tube being closed by the diaphragm.

The diaphragm may be arranged to move along a longitudinal axis of the tubes in response to a change in the pressure differential between the first chamber and the pressure reference.

The aperture may comprise an annular gap between the second end of the inner tube and the diaphragm, movement of the diaphragm being arranged to increase or decrease the size of the annular gap.

The aperture may further comprise one or more slots through the inner tube wall extending along the tube wall from the second end to form a conjoined aperture with the annular gap.

The aperture may comprise a slot through the inner tube wall and the diaphragm further comprising a flexible portion arranged to progressively cover and uncover the slot to vary the open size of the aperture as the diaphragm moves.

The separator may further comprise a fluid outlet allowing the cleaned fluid stream to exit the separator and a drain arranged to allow liquid contaminants to drain from the separator under gravity.

According to a second aspect of the present invention there is provided a crankcase ventilation system comprising: a blow-by gas inlet arranged to receive blow-by gas from a crankcase; and a separator as described above, wherein the first inlet is coupled to the blow-by gas inlet; wherein the fluid outlet is arranged to be coupled to an engine air inlet system or to discharge gases to the ambient environment.

According to a third aspect of the present invention there is provided an internal combustion engine comprising a crankcase ventilation system as described above, wherein the second inlet is arranged to receive a pressurised gas stream derived from a turbocharger and the separator is operable to separate crankcase oil from the blow-by gas, the separator drain being arranged to return separated crankcase oil to the crankcase.

According to a fourth aspect of the present invention there is provided a separator for separating contaminants from a fluid stream, comprising: an inner tube defining a first chamber, the inner tube being arranged to receive a first fluid stream including entrained contaminants at a first end; an outer tube defining an annular second chamber surrounding the first chamber and coupled to the first chamber through an aperture such that the first fluid stream can pass through the aperture into the second chamber; a third chamber separated from the first and second chambers by a diaphragm which closes off the second end of the outer tube, the third chamber having a gas inlet to maintain a reference gas pressure in the third chamber; and an impaction surface coupled to the second chamber arranged to deflect the first fluid stream after the first fluid stream enters the second chamber such that contaminants are separated from the first fluid stream; wherein the diaphragm is arranged to move along the longitudinal axis of the tubes to adjust the cross sectional area of the aperture according to a pressure differential between fluid pressure in the first chamber and fluid pressure in the third chamber.

An advantage of the fourth aspect of the present invention is that movement of the diaphragm in response to the pressure differential between the inlet and the pressure reference allows the inlet pressure to be maintained at a predetermined level relative to the reference gas pressure.

The separator may further comprise a pump arranged to generate a pressure differential across the aperture to draw the first fluid stream through the aperture.

The aperture may have a smaller cross sectional area than the first inlet and be arranged to accelerate the first fluid stream towards the impaction surface.

The rate of change of the cross sectional area of the aperture may be arranged to have a non-linear response to a change in the pressure differential.

The actuator may respond to increasing inlet pressure by increasing the open area of the aperture.

The aperture may comprise an annular gap between the second end of the inner tube and the diaphragm, movement of the diaphragm being arranged to increase or decrease the size of the annular gap.

The aperture may further comprise one or more slots through the inner tube wall extending along the tube wall from the second end to form a conjoined aperture with the annular gap.

The aperture may comprise a slot through the tube wall and the diaphragm may further comprising a flexible portion arranged to progressively cover and uncover the slot to vary the open size of the aperture as the diaphragm moves.

The separator may further comprise a fluid outlet allowing the cleaned fluid stream to exit the separator and a drain arranged to allow liquid contaminants to drain from the separator.

According to a fifth aspect of the present invention there is provided a crankcase ventilation system comprising: a gas inlet arranged to receive blow-by gas from a crankcase; a separator according to any one of the preceding claims, wherein the first chamber is coupled to the gas inlet; and a gas outlet coupled to the second chamber; wherein the gas outlet is arranged to be coupled to an engine air inlet system or to discharge gases to the ambient environment.

BRIEF DESCRIPTION OF THE DRAWINGS

Embodiments of the present invention will now be described, by way of example only, with reference to the accompanying drawings, in which.

DETAILED DESCRIPTION OF THE PREFERRED EMBODIMENT

The conventional arrangement of an engine blow-by gas/oil separator returning cleaned gas to an engine air intake is commonly referred to as a Closed Crankcase Ventilation system (CCV). Known CCV systems require the use of a crankcase pressure regulator in order to ensure that an excessive proportion of the vacuum generated by the engine air intake is not translated via the CCV separator to the engine crankcase.

Figure 1:
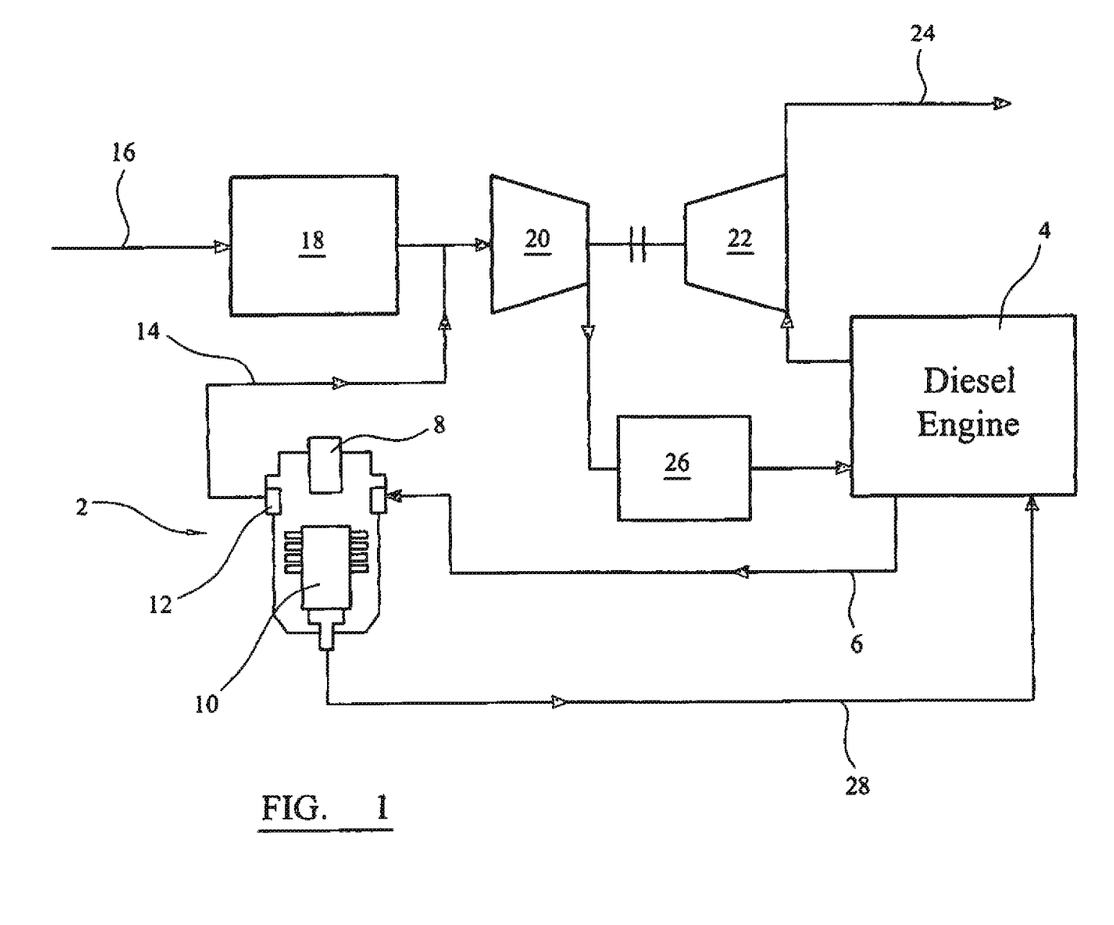
FIG. 1 schematically illustrates an engine system including a closed crankcase ventilation system.

Referring to FIG. 1, this illustrates the arrangement of a conventional CCV system 2 coupled to a diesel engine 4. Blow-by gas from the engine crankcase passes to the CCV system 2 along inlet duct 6. The CCV system 2 comprises a regulator 8 coupled to the inlet duct 6 and a contaminant separator 10 in series. The regulator 8 and separator 10 are shown combined in FIG. 1.

A pump 12 may optionally be provided within the CCV system (not separately visible in FIG. 1) to increase the pressure drop across the separator 10, thereby increasing the filtering efficiency. Cleaned blow-by gas exits the CCV system through gas outlet 14 and is returned to the engine air intake system. Specifically, the engine air intake system draws in air from outside of the vehicle through an inlet 16, the air then passing through an inlet air filter and silencer 18, a compressor 20 driven by a turbo charger 22 (in turn driven by the engine exhaust 24) and an after cooler 26 to cool the compressed air before it is supplied to the engine 4. The cleaned blow-by gas passes from the gas outlet 14 to the compressor 20. Oil and other contaminants separated from the blow-by gas are returned to the engine crankcase through oil drain 28.

In the system of FIG. 1 a portion of the vacuum generated between the turbocharger 22 and the air filter 18 is lost over the blow-by separator 10. The regulator 8 controls any remaining vacuum that would otherwise be exposed to the engine crankcase. It can be seen that the total air flow drawn by the turbo compressor 22 is not necessarily restricted by the closing of the regulator, since the difference can be drawn via the engine air filter 18.

Figure 2:
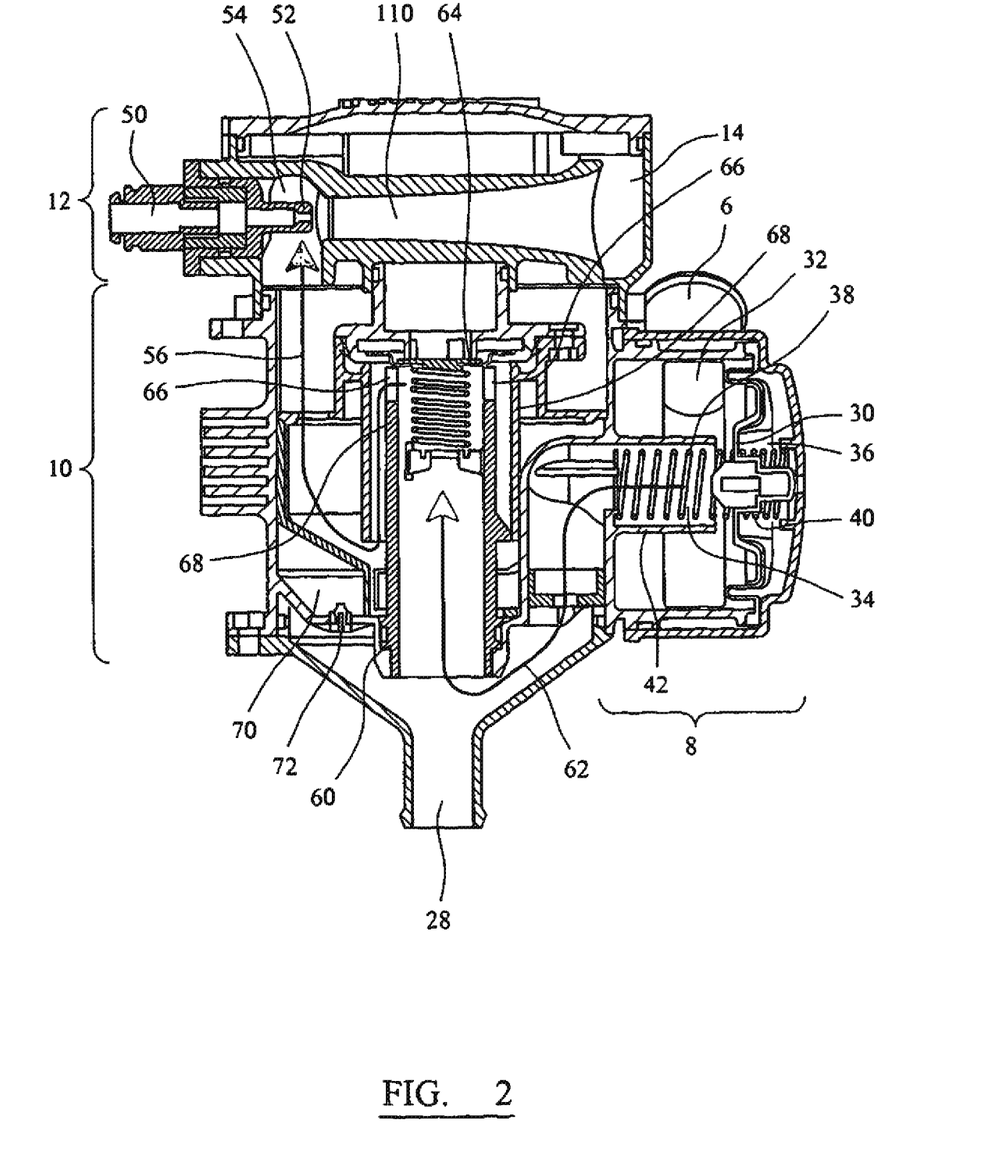
FIG. 2 illustrates in a cross sectional view a CCV system in accordance with a first embodiment of the present invention, including an impactor separator arranged to have a variable response to changing crankcase pressure.

Referring now to FIG. 2, this illustrates a cross sectional view of a CCV system in accordance with a first embodiment of the present invention for separating liquid, aerosol and particulate contaminants from a blow-by gas stream. The respective portions comprising a pressure regulator 8, a separator 10 and a pump 12 are indicated.

The regulator 8 comprises a floating diaphragm 30 which is arranged to open or close to restrict blow-by gas flow and regulate the crankcase pressure as required. Blow-by gas enters a first regulator chamber 32 through the CCV gas inlet 6. Chamber 32 is at substantially the same pressure as the engine crankcase. The diaphragm 30 at least partially occludes the gap between the first chamber 32 and a second chamber 34 (in turn coupled to the separator 10). A first side of diaphragm 30 is exposed to the blow-by gas in chamber 32. A second side of the diaphragm 30 is exposed to an ambient gas pressure within a chamber 36, which has an opening to the ambient environment. Alternatively, the third chamber 36 may be coupled to a separate pressure reference.

Movement of the diaphragm 30 is controlled by first and second springs 38, 40. Spring 38 is positioned within the second chamber and resists movement of the diaphragm 30 to close the gap between the first and second chambers 32, 34.

Spring 40 is positioned within the third chamber 36 and resists movement of the diaphragm 30 to open the gap between the first and second chambers 32, 34. Adjustment of the response of springs 38, 40 and adjustment of the relative sizes of the first and second sides of the diaphragm 30 acted upon by the blow-by gas and the ambient gas pressure can be used to control the rate and extent of movement of the diaphragm 30.

The application of an integral pump 12 to improve the separation performance of a CCV system 2 is relatively new. Pump 12 generates a larger vacuum to draw the blow-by gas through the separator 10 than the vacuum available from the compressor 20. The pressure in the first chamber 32 is regulated to the desired crankcase pressure by specification of the pump to generate the required vacuum, specifying appropriate pressure regulation spring forces within regulator 8 and by specifying the pressure response of the separator 10, as described in greater detail below. The pressure in the second chamber 34 is defined by the variable pressure loss across the separator (according to the pressure response of the separator 10) and the vacuum generated by the pump 12. The vacuum generated is determined according to the operating point along the chosen pump's flow versus pressure performance curve.

It will be appreciated that for a pumped CCV separator system the flow through the pump can be entirely restricted by the position of the regulator diaphragm. For the regulator illustrated in FIG. 2, if the diaphragm 30 comes into contact with the end of tubular wall 42 separating the first and second chambers 32, 34 then gas flow between the first and second chambers is interrupted. The effect upon the pump 12 is similar to the phenomena of pump surge in which an unregulated displacement pump can give rise to spikes in the output pressure. Restricted flow resulting from a mostly or fully closed regulator moves the pump operating point to a corresponding low flow and high vacuum position. The increased vacuum generated in the second chamber 34 further increases the force acting on the vacuum regulation springs 38, 40 and the flow of blow-by gas is restricted yet further. Only greater force acting upon the diaphragm 30 generated by a build up of positive pressure in the engine crankcase can open the regulator again. As discussed above, excessive pressure build up in a crankcase can result in damage to the crankcase and escape of oil. A closed loop control cycle of high and low pressure hunting results between the regulator and the pump which cannot be controlled with a conventional linear response regulator.

The problems of high and low pressure hunting for pumped CCV systems may also be experienced within other forms of crankcase ventilation systems. Specifically, pressure hunting may occur in open crankcase ventilation systems, non-pumped closed crankcase ventilation systems and exhaust pumped ventilation systems. More generally, the problems discussed above associated with conventional regulators may occur in any system which includes a pressure regulator.

An improved regulator which addresses the problems of high and low pressure hunting and pump surge is the subject of a separator patent application commonly owned by the present applicant in the UK (GB-0921576.5 filed on 10 Dec. 2009). In accordance with the present invention, the impactor 10 incorporates a similar form of pressure regulation to that disclosed in GB-0921576.5.

Pump 12 serves to generate a region of low gas pressure in order to draw contaminated blow-by gases through separator 10. The pump 12 in accordance with certain embodiments of the present invention can be considered to be a type of jet pump. Similar jet pumps in combination with separators are described in WO-2009/037496-A2. A first inlet 50 to the pump 12 receives a source of pressurised gas, referred to herein as boost gas. The boost gas may be provided by the turbo charger 22 or any other source of pressurised gas such as exhaust gas. The boost gas need not be at a high velocity on entering the boost gas inlet. The boost gas could be static, though under pressure. Optionally, the boost gas could be obtained from the exhaust or the turbocharger and stored in a separate holding chamber or collector prior to being passed to the boost gas inlet.

Boost gas enters the pump via boost gas inlet 50. When used on a turbocharged engine the boost gas may be a derived from a source of pressurised gas such as the intake manifold. Alternatively, the pressurised gas could be derived directly from the turbocharger, however it is preferable to derive the air from the intake manifold as at this stage the turbocharger gas has passed through a heat exchanger (alternatively referred to as an intercooler) so that it is cooled from approximately 180-200° C. to 50-60° C. Using cooler boost gas allows the separator to be formed from lower cost materials which do not need to be resistant to such high temperatures. Alternatively, exhaust gas derived from before or after the turbocharger may be used as the boost gas. The boost gas typically is at a pressure of between 1 Bar and 4 Bar.

The boost gas passes through nozzle 52, which accelerates the boost gas (and causes a consequent reduction in pressure). The nozzle 52 is formed as a convergent nozzle. In particular, the nozzle may be a convergent-divergent nozzle, such as a de-Lavaal nozzle, which is well known in the art. Other suitable nozzle shapes are known, including any nozzle having a restricted central portion. The boost gas is accelerated to a high velocity, for instance between 100-500 m·s$^{-1}$, with the boost gas typically exceeding mach 1 at least in the region of nozzle 52. A convergent nozzle advantageously accelerates the boost gas to very high speeds, which consequently entrains the blow-by gas and accelerates the blow-by gas to high speeds. The nozzle is arranged to generate a region of reduced pressure to draw in the blow-by gas.

The resultant high speed boost gas jet passes into chamber 54. The high velocity boost gas jet causes a region of reduced pressure within the chamber 54 in the vicinity of the nozzle 52. Pressure is reduced by up to 150 mBar relative to external atmospheric pressure. This reduction in pressure allows cleaned blow-by gas from the separator 10 to be drawn into chamber 54 generally along the path of arrow 56. The passage of the blow by gas from regulator 8 through separator 10 is described below. Blow-by gas is sucked into chamber 54. The blow-by gas flow is entrained and accelerated by the boost gas, intermixing with the boost gas and accelerating to approach the speed of the boost gas.

The boost gas nozzle 52 and the annular blow-by gas inlet 54 are generally constructed in the form of a jet pump, as is known in the art. The combined gas stream passes into a diffuser tube 110. In order to achieve satisfactory entrainment and acceleration of the blow-by gas, preferably the diameter of the diffuser tube 110 should be between 2 to 5 times greater, preferably 3 to 4 times greater, than the critical diameter (typically, the smallest diameter) of boost gas nozzle 52. The position of the critical diameter (alternatively referred to as the throat of the nozzle) may vary from the narrowest point of the nozzle due to aerodynamic effects, as is known in the art of nozzle design.

The diffuser tube is generally formed as a cylinder, however the side walls are not necessarily straight for the whole of their length. The side walls may taper outwardly towards the end of the tube remote from nozzle 52. This tapering assists in controlling the direction of flow and mixing of the combined gas flow.

The contaminated blow-by gas is actively drawn out of the crankcase and through the separator allowing for control of the crankcase pressure. The pressure within the crankcase is typically controlled to within +/−50 mBar relative to external atmospheric pressure, with the pressure differential to atmospheric pressure controlled by the regulator 8 as described above. The pressure drop from the crankcase pressure in chamber 32 to the low pressure in chamber 54 allows for higher efficiency separation within separator 10, as described below.

It will be appreciated that although the primary form of pump described in the present specification is a jet pump as shown in FIG. 2, other known forms of pump may be used in order to achieve the required pressure drop across separator 10. The pressure drop across the separator 10 generated by the pump 12 overcomes the high pressure differential of the separator 10 without causing an excessively high crankcase pressure. That is, because of the reduction in pressure caused by the pump 12, the blow-by gas may be drawn through a smaller impaction gap causing more efficient separation.

After the blow-by gas passes through regulator 8 into chamber 34, the gas is drawn into the separator inlet tube 60 generally along the path indicated by arrow 62. The blow-by gas then passes upwards through the separator inlet tube 60, which is partially closed at its upper end by diaphragm 64. The blow-by gas then passes through one or more slots 66 and is incident upon an annular impaction surface 68. Oil and other contaminants separated from the blow-by at impaction surface 68 flow under gravity to oil sump 70 surrounding the separator inlet tube 60 and then to oil drain 28 through check valve 72. Additionally, oil which is already separated from the blow-by gas within regulator 8 can also flow to oil sump 70. Oil from drain 28 is returned to the crankcase.

Figure 3:
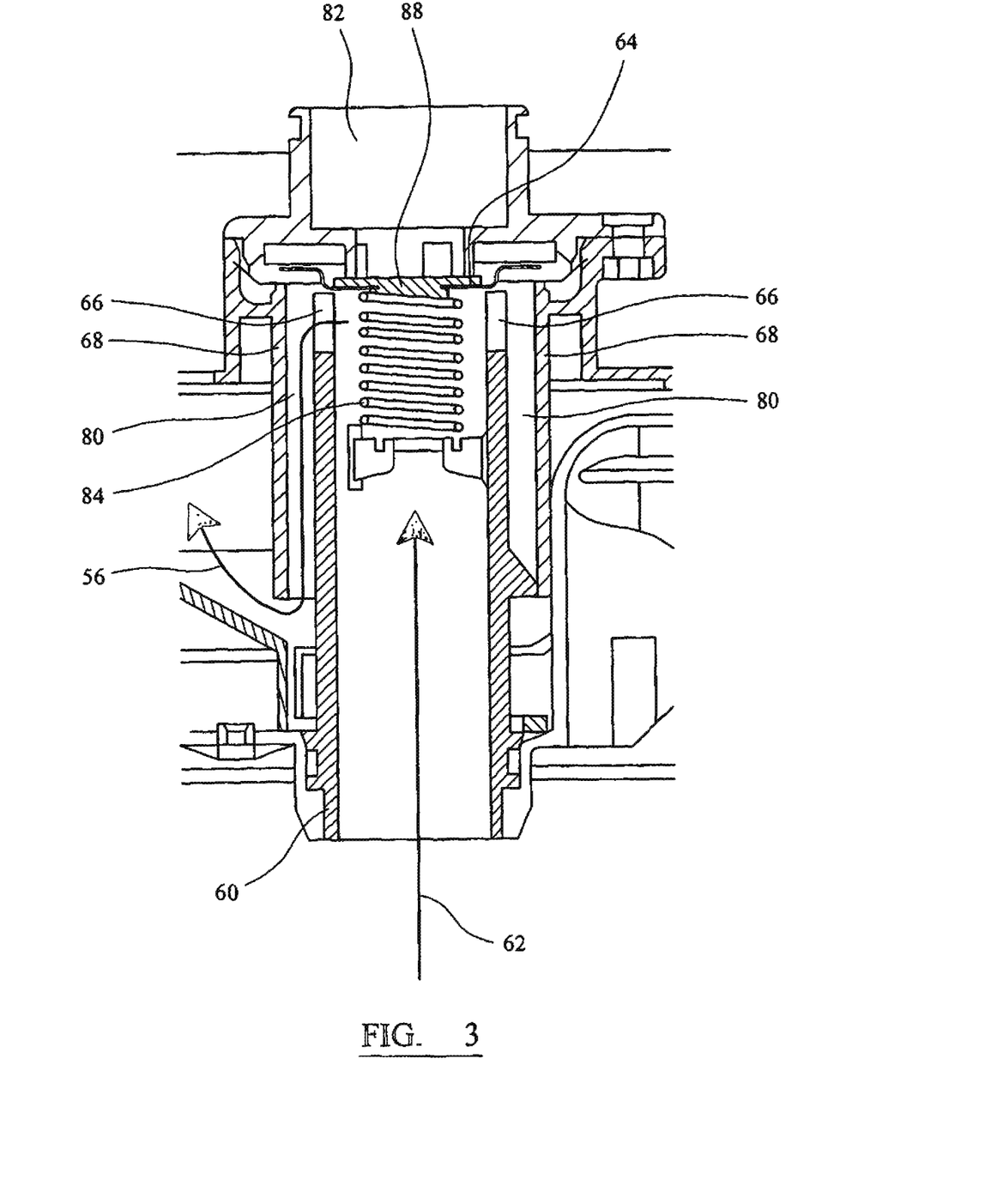
FIG. 3 is an enlarged cross sectional view of the CCV system impactor separator of FIG. 2.

The separator 10 may be considered to be a variable impactor separator as it is intended to respond to differences between the blow-by gas inlet pressure and the outlet pressure to increase the separation efficiency, as will now be described with reference to FIG. 3.

Contaminated engine crankcase blow-by gases enter the separator inlet tube 60 along the path of arrow 62. The upper end of inlet tube 60 is separated from an annular impaction chamber 80 by diaphragm 64. Diaphragm 64 may form a radial seal with the upper end of tube 60 or the diaphragm may be arranged to never fully make contact with tube 60. Diaphragm 64 also separates the inside of tube 60 from chamber 82. Chamber 82 is kept at atmospheric pressure by an air inlet (not shown) which connects to the outside of the CCV system. The inside of tube 60 is at substantially the same pressure as the engine crankcase, allowing for any difference in pressure across regulator 8.

Figure 4:
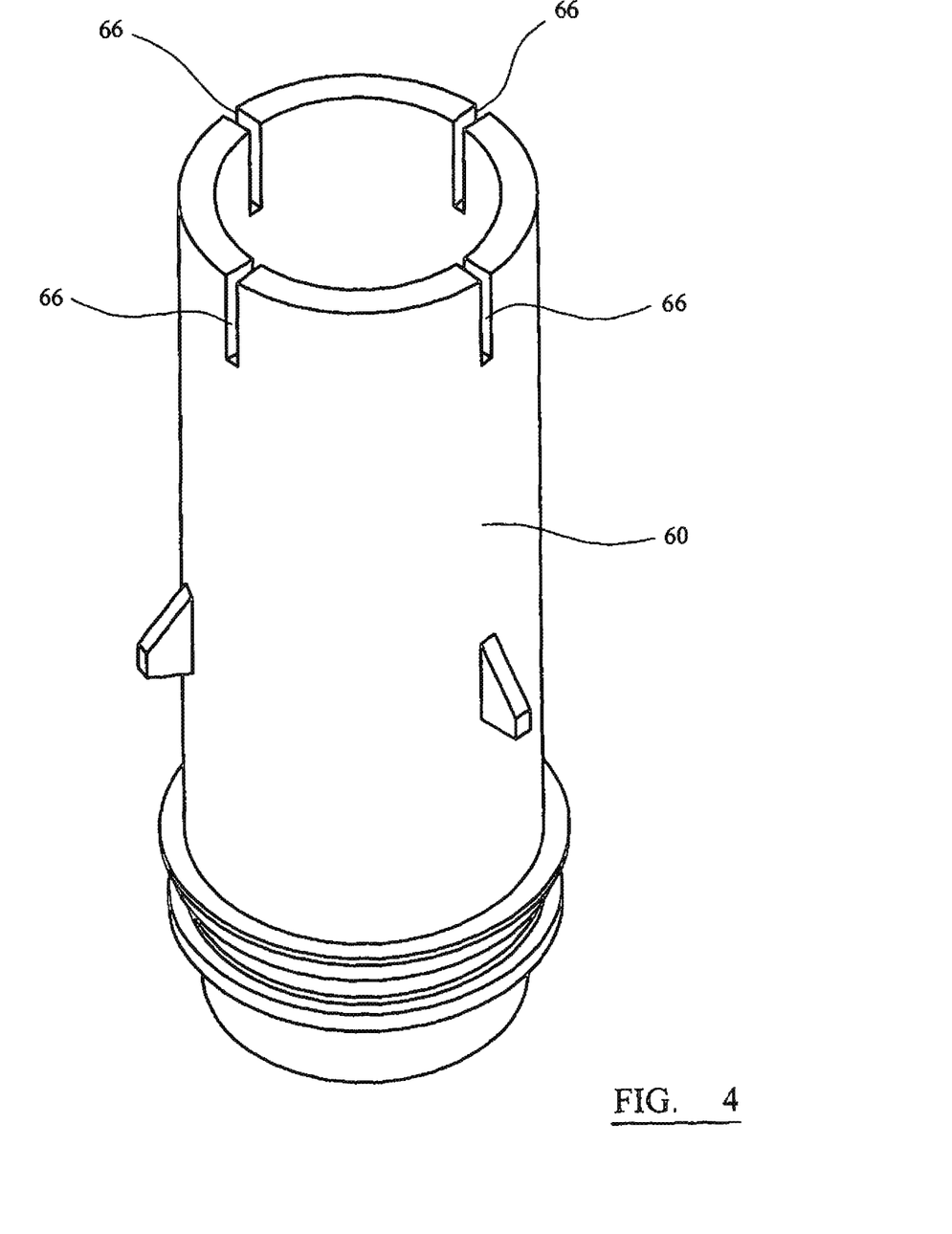
FIG. 4 is a perspective view of the impactor tube of FIG. 2.

Blow-by gas passes into the impaction chamber 80 through one or more vertical slots 66 which are open at the upper end of the tube. The form of slots 66 can be more clearly understood through the perspective view of FIG. 4. The size and number of slots 66 determines the minimum differential pressure drop across the variable impactor separator system. This pressure drop is directly related to the separation efficiency of the CCV system.

Impaction and separation of oil particles due to radial acceleration in making a 180° turn occurs both on the diaphragm face and the impaction surface 68. The impaction surface may be covered with a material opposite the slots 66 to improve the co-efficient of restitution of oil droplets on the outer walls, rather than act as a pass through media. The media covering the impaction surface serves to reduce re-entrainment of the contaminants. Oil separated from the blow-by gas at the impaction surface 68 then flows under gravity to the oil sump 70 and ultimately to oil drain 28 as described above.

The jet pump 12 connected downstream of impaction chamber 80 is used to overcome the pressure drop of the variable impactor separator. The separation performance achievable is therefore no longer limited as with conventional un-powered impactor systems. At the same time an acceptable crankcase pressure close to atmospheric pressure can be maintained.

Under various engine load, speed or engine breaking conditions both the vacuum generated by the jet pump 12, and the volume of blow-by gas passing through the separator 10 change. To maintain an acceptable crankcase pressure according to the variable vacuum conditions generated by the jet pump 12, the diaphragm 64 is allowed to open and close the gap between the top of the tube 60 and the diaphragm 64 above the open ends of the slots 66. The chamber 82 is kept at atmospheric pressure such that any net positive pressure on the diaphragm will cause it to open creating or widening an annular gap above the end of tube 60, which reduces the pressure drop across the separator 10. As soon as a net vacuum is generated by the jet pump the diaphragm fully closes (which as noted above may cause the diaphragm 64 to contact the top of the tube, or a gap may be obtained), ensuring that the separator 10 is operating at maximum separation efficiency. The pressure differential of the separator 10 is adjusted and crankcase pressure can be regulated precisely according to the specification of the regulation spring 84. Spring 84 extends between supports 86 within tube 60 and the diaphragm 64, to which it is attached at central part 88. Additionally a second regulation spring may be provided in chamber 82 to act upon the opposite side of diaphragm 64 to control positive pressures.

The CCV system described above in accordance with FIGS. 2 to 4 incorporates a pressure regulator 8 arranged to control the crankcase pressure and an impactor separator 10. In a further enhancement in accordance with the present invention, the separator 10 may be provided with one or more slots 66 which are shaped to provide an appropriate variation in open cross sectional area according to the pressure differential between the blow-by gas pressure and atmospheric pressure, which is achieved by having a slot with a specifically chosen cross sectional area. This may in addition to, or as a complete replacement to, the pressure regulator 8. A separator 10 in accordance with this embodiment of the invention is shown in FIG. 5.

Figure 5:
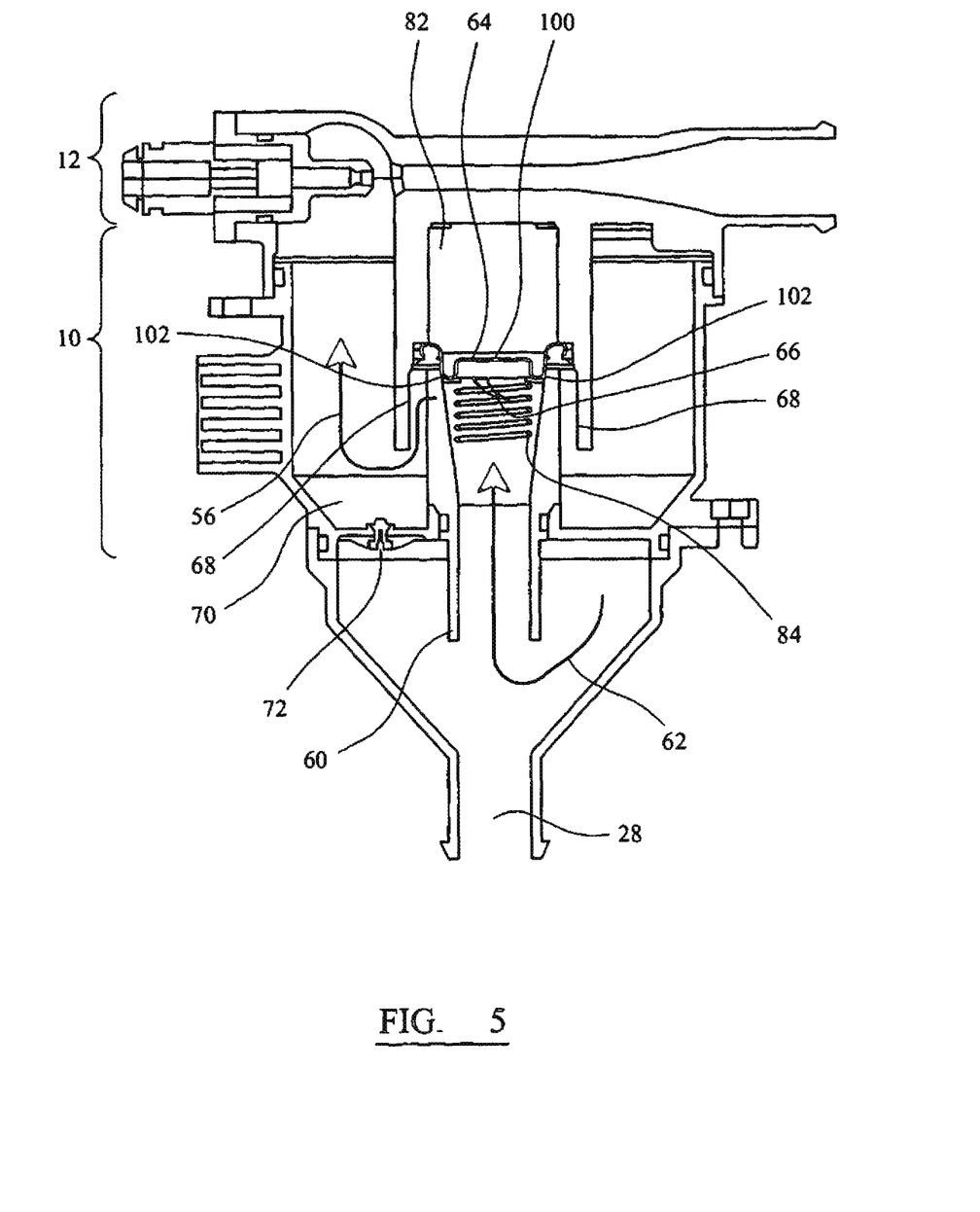
FIG. 5 is a cross sectional view of a CCV system impactor separator in accordance with a second embodiment of the present invention.

FIG. 5 shows a separator 10 incorporating the function of an anti pump-surge regulator within an impactor separator. The diaphragm 64 comprises a rolling diaphragm, which is used to precisely adjust the aperture of a variable slot profile to regulate crankcase pressure and control the phenomenon of pump surge. Specifically, the diaphragm 64 comprises a central portion 100 arranged to couple to regulator spring 84. As for the embodiment of FIG. 3 there may be a second regulator spring within atmospheric reference chamber 80. The diaphragm 64 further comprises an annular rolling portion 102, alternatively referred to as a rolling convolute, which progressively covers and uncovers slot 66 as the central portion 100 moves up and down.

The rolling diaphragm 64 can be used to optimise the performance of the impactor separator 10 according to the available vacuum pressure from pump 12. As the available vacuum increases, the diaphragm 12 closes, thus increasing velocity, separation performance and pressure differential across the impactor 10 until atmospheric pressure is equalised by the inlet pressure to the separator. Slot 66 generally comprises a tapering slot, which may be curved as shown. Towards the diaphragm 64, slot 66 broadens significantly so as to provide for a large flow of blow-by gas in the event of a reduction in the available vacuum from pump 12, thereby preventing the crankcase pressure rising unacceptably.

Figure 6:
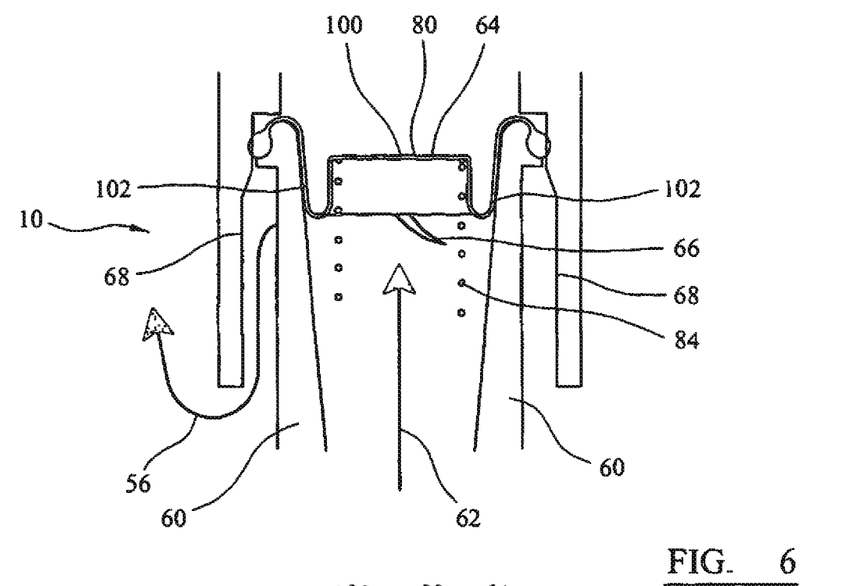
FIG. 6 is an enlarged cross sectional view of a diaphragm forming part of the CCV system impactor separator of FIG. 5 in a closed position.
Figure 7:
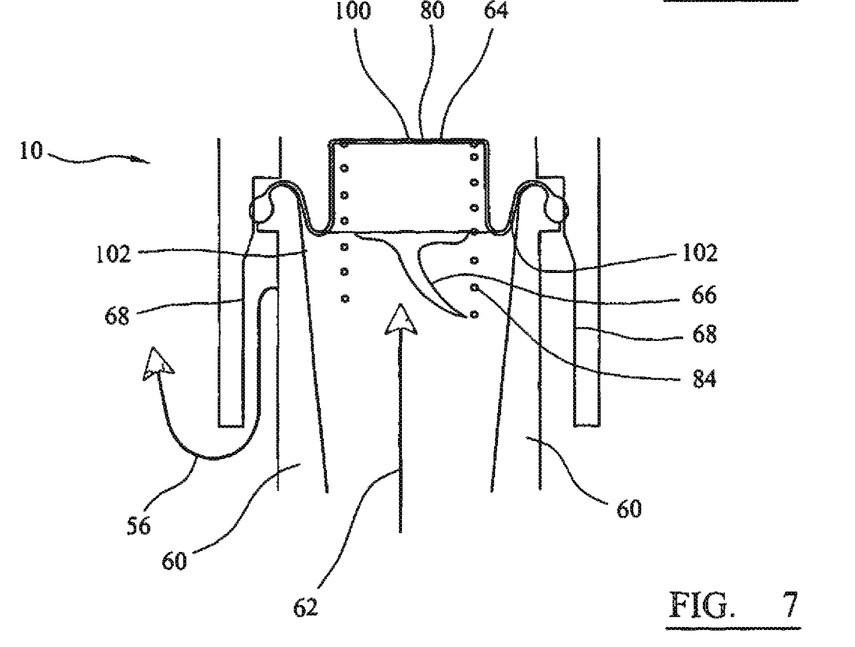
FIG. 7 is an enlarged cross sectional view of a diaphragm forming part of the CCV system impactor separator of FIG. 5 in an open position.

FIG. 6 shows the diaphragm 64 in a generally closed position, although it will be appreciated that the diaphragm may move further downwards. Only the bottom, narrow portion of the slot is exposed and available for gas to flow through. In FIG. 7 the diaphragm 64 in a generally open position, although it will be appreciated that the diaphragm may move further upwards. A greater proportion of the slot is exposed, including the broader upper part, and available for gas to flow through. When fully uncovered the slot 66 may appear generally as a cartoon speech bubble. The narrow portion of slot 66 is intended to produce the precise pressure control function required to counter pump-surge conditions. When the diaphragm 64 is closing the minimal open area gives a high pressure differential across the separator 10 and optimal impactor performance for the available pump vacuum. The large upper area of slot 66 is matched to regulate crankcase pressure under high flow conditions, such as may be experienced in a worn engine or under engine braking. The diaphragm may be arranged to fully cover the slot 66 at the furthest extent of its downward movement, or to ensure that at least part of the slot remains open. Adjustment of the response of the or each spring and adjustment of the relative sizes of the first and second sides of the diaphragm 64 acted upon by the blow-by gas, the ambient gas pressure and the pump vacuum can be used to control the rate and extent of movement of diaphragm 64.

Slot 66 comprises a variable section impactor slot. The varying size of slot 66 exposed by the diaphragm as it moves has benefits both in terms of the separation of particles from the blow-by gas stream and also for control of crank case pressure. The blow-by gas stream includes a range of particle sizes travelling at the same velocity but having different momentums due to their different sizes and masses. Heavy particles with a high momentum exit towards the top of the tube through the wider part of the slot. Lighter particles exit the tube lower down the slot. As the slot is smaller at the bottom, lighter particles are accelerated to a higher velocity, thereby increasing their momentum. Advantageously, this reduces the difference in momentum between small and large particles which allows for a reduction in the difference in separation efficiency between small and large particles without restricting the aperture size (which would cause an increase in crankcase pressure).

Furthermore, the variable section impactor slot improves the pressure control across the separator. When the diaphragm is raised and the wide upper section of the slot is exposed, this allows for a large aperture size which is able to accommodate high volume blow-by gas conditions while maintaining the pressure differential across the separator (and hence the inlet pressure of the blow-by gas and the crankcase pressure) within acceptable limits. When the diaphragm lowers, the decreased open area of the lower section of the slot increases the pressure differential across the separator, thereby preventing negative pressures being generated in the crankcase (relative to atmospheric pressure). The changing cross-sectional area of the aperture provides a non-linear pressure differential response for a linear movement of the diaphragm, which allows for improved, and controllable, regulation of the pressure differential across the separator. The improvement in pressure differential allows the separate pressure regulator at the blow-by gas inlet to the CCV system to be omitted in certain embodiments of the present invention.

The diaphragm 64 comprises an actuator arranged to control the flow of blow-by gas through slot 66. Slot 66 is cut into the tubular wall 60. The slot 66, in combination with the tubular structure 60 defines an open area through which blow-by gas can flow. The shape of the slot 66 is arranged to ensure that the pressure differential across the slot is appropriate for the flow-rate and vacuum characteristics generated by the pump. By controlling the shape of slot 66 a linear or non linear relationship between any change in pump vacuum, atmospheric pressure and crankcase pressure and the corresponding distance travelled by the diaphragm can be achieved. More specifically, the shape of the slot 66 can be chosen such that movement of the diaphragm 64 at a constant rate causes a non-linear response in the open area of the slot. Effectively any closed loop control function can be can be generated by the diaphragm 64 in response to a given input from the pump. More accurate crankcase pressure regulation can be achieved than for conventional arrangements of separators and regulators. Moreover, because regulation of the crankcase pressure is combined with the separator there may be no need to provide an additional pressure regulator. Furthermore, the separation efficiency is increased by accurately controlling the flow of the blow-by gas.

It can be seen that for the slot 66 of FIG. 5, as diaphragm 64 moves downwards, the rate of reduction of the open area of the slot increases. This is because the slot 66 tapers towards its closed end. Movement of diaphragm 64 may be limited to ensure that the open area is never completely closed off.

It will be readily apparent to the appropriately skilled person that the shape of the slot 66 may vary significantly in order to achieve the desired closed loop control function. For instance, the slot may broaden towards its closed end, be of constant width or initially taper and terminate with an enlarged portion to prevent full closure of the open area. Furthermore, multiple slots of different sizes and shapes may be provided around the tubular wall. It will be further apparent that the way in which movement of the diaphragm 64 covers and uncovers the slot may vary, and alternatives to the rolling convolute will be apparent to the skilled person and fall within the scope of certain of the appended claims. The scope of the appended claims should be considered to cover any variable separator incorporating a regulator in which a first chamber and a second chamber are coupled together by one or more slots and the size of the or each slot is arranged to be varied according to the position of a diaphragm or other moveable actuator which adjusts its position according to a pressure differential between gas in the first and/or second chambers and an external pressure reference.

Variable separators according to the present invention have been primarily described herein in use as part of a CCV system. However, it will be readily apparent to the appropriately skilled person that they may be more widely applicable. More generally, such a separator may be used in any application in which it is necessary to filter contaminants from a fluid stream and desirable to regulate a pressure drop for a fluid between a first chamber and a second chamber, with reference to an external pressure. Typically, the fluid will be a gas. Separators according to the present invention are of particular benefit in pumped systems in order to obviate or mitigate the effects of pump surge and pressure hunting described above.

Separators according to the above described embodiments of the present invention have been observed to provide gravimetric separation efficiency in the range 95-98% for particles greater than or equal to 0.3 μm. It is possible that smaller particles still may be efficiently filtered.

Embodiments of the present invention adapted to filter contaminants from blow-by gas in a closed loop system typically operate with a flow of blow-by gas of 50-800 l/min. The flow of boost gas through nozzle 52 when using boost gas derived from the turbocharger of an engine typically comprises less than 1% of the total engine gas flow, so as to have a negligible effect on engine performance.

It will be appreciated that the CCV system described above may be modified. For instance, the boost gas may be derived from the vehicle exhaust. Cleaned blow-by gas may similarly be passed to be combined with the exhaust gases. Separated oil may be stored separately and not returned to the crankcase. Other possible configurations will be readily apparent to the appropriately skilled person.

The separator may typically be made from a polymeric material, for example glass filled nylon. Other constructions and materials will be readily apparent to the appropriately skilled person. For example, the pump nozzle may be made from a sintered or metal injection moulded part. The various parts of the separator may be joined together using appropriated fixing techniques, which will be well known to the skilled person, such as dips, bolts, adhesive or welding. Seals such as O-rings may be provided to prevent leakage from the separator.

Although particular embodiments of the present invention described above relate primarily to the use of the described separator for separating particulate and liquid aerosol contaminants from a blow-by gas stream within a reciprocating engine, the present invention is not limited to this. Indeed, the separator can be used to separate contaminants from a gas stream derived from other forms of internal combustion engine. More generally, the present invention can be applied to separate contaminants from any gas stream, such as compressed air lines, separating cutting fluid from gas streams in machine tools and separating oil mist in industrial air compressors. More generally still, the present invention can be used to separate contaminants from any fluid stream. That is, it may also be applied to liquid streams. The separator may be advantageously used to separate contaminants from an oil or fuel supply within an internal combustion engine. The separator can be used in both open loop systems where the cleaned fluid stream is vented to the atmosphere, or in closed loop systems where the cleaned fluid stream is reused.

The boost gas can be derived from any source of pressurised gas, for instance exhaust gas, compressed gas from a turbocharger or an engine intake manifold, compressed gas from a vehicle braking system or other sources.

The separator may comprise a stand alone device. Alternatively, it may readily be integrated into other engine components, for example an engine valve cover, timing cover, crankcase, cylinder head, engine block or turbocharger. The separator may be mounted directly on the engine, or mounted away from the engine.

Further modifications and applications of the present invention will be readily apparent to the appropriately skilled person, without departing from the scope of the appended claims

What is claimed is:

1. A separator for separating contaminants from a fluid stream, comprising:
    a first chamber having a first inlet arranged to receive a first fluid stream including entrained contaminants;
    a second chamber fluidly coupled to the first chamber through an aperture such that the first fluid stream can pass through the aperture into the second chamber;
    an actuator arranged to adjust the cross sectional area of the aperture according to a pressure differential between fluid pressure in the first chamber and a pressure reference;
    an impaction surface in the second chamber located in spaced-apart relation from the aperture in the path of the first fluid stream so as to deflect the first fluid stream after the first fluid stream enters the second chamber such that contaminants are separated from the first fluid stream; and
    a jet pump arranged to generate a pressure differential across the aperture to draw the first fluid stream through the aperture;
    wherein the jet pump comprises a third chamber having a second inlet for receiving a second fluid stream into the third chamber, the second inlet including a convergent nozzle for accelerating the second fluid stream, and a third inlet for receiving the first fluid stream downstream of the impaction surface, the third inlet being arranged relative to the second inlet such that the second fluid stream can entrain and accelerate the first fluid stream.

2. A separator according to claim 1, wherein the aperture has a smaller cross sectional area than the first inlet and is located to accelerate the first fluid stream towards the impaction surface.

3. A separator according to claim 1, wherein the actuator and aperture cooperate such that the rate of change of the cross sectional area of the aperture varies in a non-linear manner with respect to a change in the pressure differential.

4. A separator according to claim 3, wherein the actuator is arranged to adjust the cross-sectional area of the aperture such that it responds to increasing pressure in the first chamber by increasing the open area of the aperture.

5. A separator according to claim 1, wherein the actuator comprises a diaphragm separating the first and second chambers from the pressure reference, and wherein the pressure reference comprising a fourth chamber having an air inlet such that the third chamber is at atmospheric pressure.

6. A separator according to claim 5, wherein the first chamber is defined by an inner tube arranged to receive the first fluid stream at a first end of the inner tube and the second chamber is defined by an outer tube surrounding the inner tube and surrounding the first chamber, the second end of the outer tube being closed by the diaphragm.

7. A separator according to claim 6, wherein the diaphragm is arranged to move along a longitudinal axis of the tubes in response to a change in the pressure differential between the first chamber and the pressure reference.

8. A separator according to claim 6, wherein the aperture comprises an annular gap between the second end of the inner tube and the diaphragm, movement of the diaphragm being arranged to increase or decrease the size of the annular gap.

9. A separator according to claim 8, wherein the aperture further comprises one or more slots through the inner tube wall extending along the tube wall from the second end to form a conjoined aperture with the annular gap.

10. A separator according to claim 6, wherein the aperture comprises a slot through the inner tube wall and the diaphragm further comprising a flexible portion arranged to progressively cover and uncover the slot to vary the open size of the aperture as the diaphragm moves.

11. A separator according to claim 1, further comprising a fluid outlet allowing the cleaned fluid stream to exit the separator and a drain arranged to allow liquid contaminants to drain from the separator under gravity.

12. A crankcase ventilation system comprising:
- a blow-by gas inlet arranged to receive blow-by gas from a crankcase; and
- a separator according to claim 11, wherein the first inlet is coupled to the blow-by gas inlet;
- wherein the fluid outlet is arranged to be coupled to an engine air inlet system or to discharge gases to the ambient environment.

13. An internal combustion engine comprising a crankcase ventilation system according to claim 12, wherein the second inlet is arranged to receive a pressurized gas stream derived from a turbocharger and the separator is operable to separate crankcase oil from the blow-by gas, the separator drain being arranged to return separated crankcase oil to the crankcase.

14. A separator for separating contaminants from a fluid stream, comprising:
- an inner tube defining a first chamber, the inner tube being arranged to receive a first fluid stream including entrained contaminants at a first end;
- an outer tube surrounding the inner tube, defining an annular second chamber surrounding the first chamber and coupled to the first chamber through an aperture such that the first fluid stream can pass through the aperture into the second chamber, wherein the outer tube annularly surrounds and is co-axial with the inner tube, the geometric axis of the tubes defining a longitudinal axis;
- a third chamber separated from the first and second chambers by a diaphragm which closes off the second end of the outer tube, the third chamber having a gas inlet to maintain a reference gas pressure in the third chamber; and
- an impaction surface coupled to the second chamber arranged to deflect the first fluid stream after the first fluid stream enters the second chamber such that contaminants are separated from the first fluid stream;
- wherein the diaphragm is arranged to move along the longitudinal axis of the tubes to adjust the cross sectional area of the aperture according to a pressure differential between fluid pressure in the first chamber and fluid pressure in the third chamber.

15. A separator according to claim 14, wherein the separator further comprises a pump arranged to generate a pressure differential across the aperture to draw the first fluid stream through the aperture.

16. A separator according to claim 14, wherein the aperture has a smaller cross sectional area than the first inlet and is arranged to accelerate the first fluid stream towards the impaction surface.

17. A separator according to claim 14, wherein the diaphragm and aperture cooperate such that the rate of change of the cross sectional area of the aperture varies in a non-linear manner with respect to a change in the pressure differential.

18. A separator according to claim 14, wherein the actuator responds to increasing inlet pressure by increasing the open area of the aperture.

19. A separator according to claim 14, wherein the aperture comprises an annular gap between the second end of the inner tube and the diaphragm, movement of the diaphragm being arranged to increase or decrease the size of the annular gap.

20. A separator according to claim 19, wherein the aperture further comprises one or more slots through the inner tube wall extending along the tube wall from the second end to form a conjoined aperture with the annular gap.

21. A separator according to claim 14, wherein the aperture comprises a slot through the tube wall and the diaphragm further comprising a flexible portion arranged to progressively cover and uncover the slot to vary the open size of the aperture as the diaphragm moves.

22. A separator according to claim 14, further comprising a fluid outlet allowing the cleaned fluid stream to exit the separator and a drain arranged to allow liquid contaminants to drain from the separator.

23. A crankcase ventilation system comprising:
- a gas inlet arranged to receive blow-by gas from a crankcase;
- a separator according to claim 14, wherein the first chamber is coupled to the gas inlet, and
- a gas outlet coupled to the second chamber;
- wherein the gas outlet is arranged to be coupled to an engine air inlet system or to discharge gases to the ambient environment.

24. A separator for separating contaminants from a fluid stream, comprising:
- a first chamber having a first inlet arranged to receive a first fluid stream including entrained contaminants;
- a second chamber fluidly coupled to the first chamber through an aperture such that the first fluid stream can pass through the aperture into the second chamber;
- an actuator arranged to adjust the cross sectional area of the aperture according to a pressure differential between fluid pressure in the first chamber and a pressure reference;
- an impaction surface in the second chamber located in spaced-apart relation from the aperture in the path of the first fluid stream so as to deflect the first fluid stream after the first fluid stream enters the second chamber such that contaminants are separated from the first fluid stream; and
- a pump arranged to generate a pressure differential across the aperture to draw the first fluid stream through the aperture;
- wherein the pump comprises a third chamber having a second inlet for receiving a second fluid stream into the third chamber, the second inlet including a convergent nozzle for accelerating the second fluid stream, and a third inlet for receiving the first fluid stream downstream of the impaction surface, the third inlet being arranged relative to the second inlet such that the second fluid stream can entrain and accelerate the first fluid stream;
- wherein the actuator comprises a diaphragm separating the first and second chambers from the pressure reference, and wherein the pressure reference comprising a fourth chamber having an air inlet such that the third chamber is at atmospheric pressure;
- wherein the first chamber is defined by an inner tube arranged to receive the first fluid stream at a first end of the inner tube and the second chamber is defined by an outer tube surrounding the inner tube and surrounding the first chamber, the second end of the outer tube being closed by the diaphragm;
- wherein the diaphragm is arranged to move along a longitudinal axis of the tubes in response to a change in the pressure differential between the first chamber and the pressure reference; and wherein the outer tube annularly surrounds and is co-axial with the inner tube, the geometric axis of the tubes defining the longitudinal axis.

25. A separator according to claim 15, wherein the pump comprises a jet pump, the jet pump including a jet pump chamber and having a second inlet for receiving a second fluid stream into the jet pump chamber, the second inlet including a convergent nozzle for accelerating the second fluid stream, and a third inlet for receiving the first fluid stream downstream of the impaction surface, the third inlet being arranged relative to the second inlet such that the second fluid stream can entrain and accelerate the first fluid stream.

\* \* \* \* \*